Mar. 6, 1923.
E. A. RUTENBER.
ELECTRIC TOASTER.
FILED MAR. 28, 1922.
1,447,574
2 SHEETS—SHEET 1.
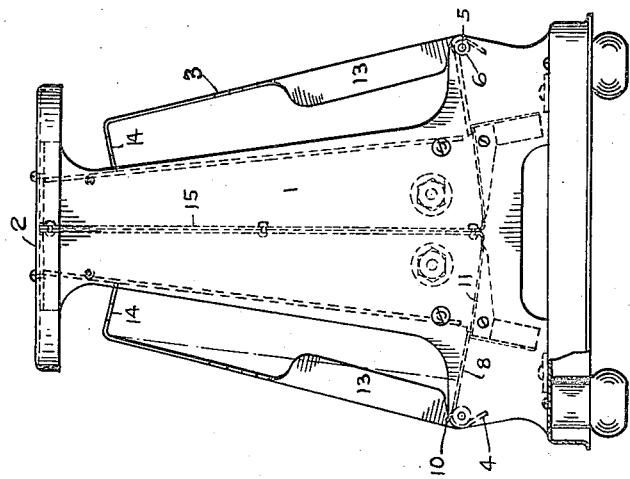
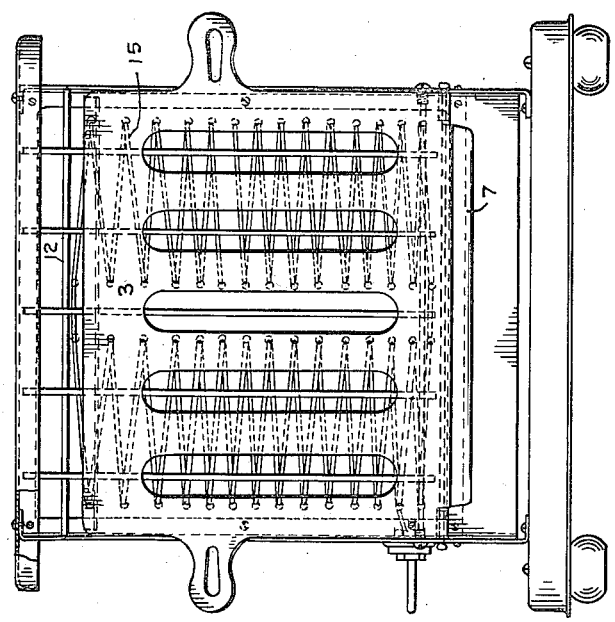
Inventor
Edwin A. Rutenber
By his Attorney Mar. 6, 1923. 1,447,574.
E. A. RUTENBER.
ELECTRIC TOASTER.
FILED MAR. 28, 1922. 2 SHEETS—SHEET 2.

Inventor
Edwin A. Rutenber
By his Attorney

Patented Mar. 6, 1923.

1,447,574

UNITED STATES PATENT OFFICE.

EDWIN A. RUTENBER, OF MILWAUKEE, WISCONSIN, ASSIGNOR TO A. J. LINDEMANN & HOVERSON COMPANY, OF MILWAUKEE, WISCONSIN.

ELECTRIC TOASTER.

Application filed March 28, 1922. Serial No. 547,582.

*To all whom it may concern:*

Be it known that I, EDWIN A. RUTENBER, a citizen of the United States, and a resident of the city of Milwaukee, in the county of Milwaukee, State of Wisconsin, have invented certain new and useful Improvements in Electric Toasters, of which the following is a specification.

The improvements relate to electric toasters and particularly to toasters of this class in which provision is made for the turning of the toast or the like, without necessitating handling. Their objects are, among others, to strengthen, simplify, and render more durable, efficient, and certain in action the parts involved in the turning operation, and to provide means for this operation which act automatically and will not be interfered with or fouled by the article toasted, or in turn damage or interfere with it.

Figure 3:
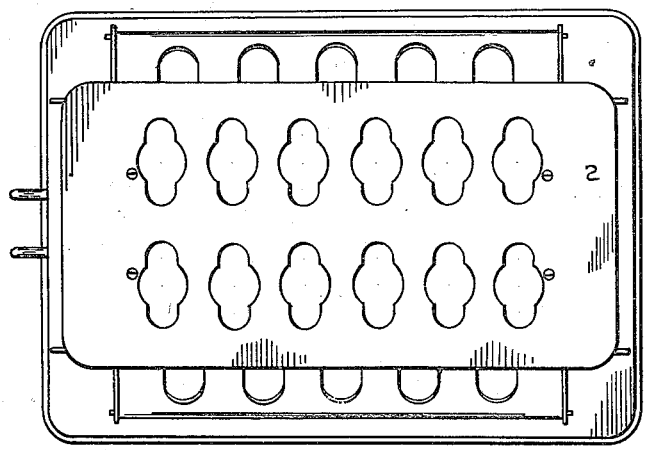
Figure 6:
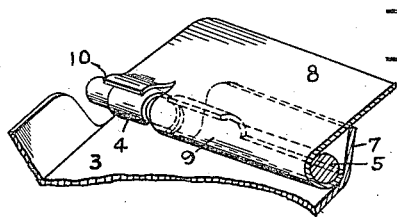
Figure 5:
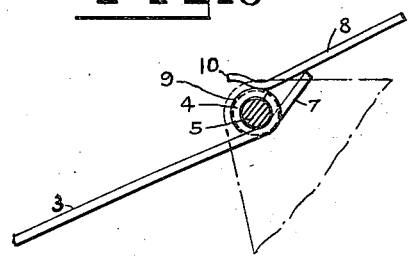
Figure 4:
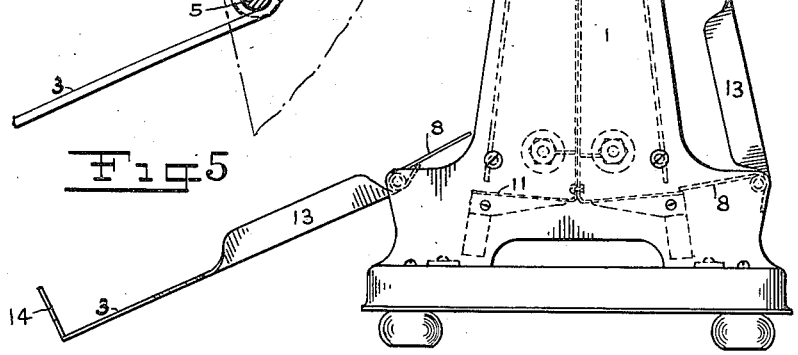

The improvements are illustrated in the accompanying drawings, in which Figure 1 is an elevation of a toaster embodying the improvements; Fig. 2 is an end view of the same; Fig. 3 is a plan of the same; Fig. 4 is an end view with the door and reversing means open, and Figs. 5 and 6 an enlarged detail end view and perspective of the reverser and adjacent parts.

Heretofore toasters have been made with reversing backs, bars or plates of various constructions, but among the objections common to all of them are that the face of the toast or other article to be toasted is brought in contact with some part of the device while it is cooking; that there are parts having relatively sharp contact surfaces which may be brought in contact therewith and that loose particles of carbon or food cooked or uncooked are likely to be brushed or shaken off and permitted to fall inside the toaster. These features are objectionable even when plain dry toast is being made, but are much more objectionable when bread spread with butter or other substance which becomes fluent under the action of heat, or where sandwiches are being toasted. A toaster made in accordance with the present improvements may be used for a variety of purposes without undesirable results, and may even be employed to toast or broil other foods than those of which bread, crackers or the like form a part.

In the drawings, 1 represents an end frame, 2 the top extending from one end frame to the other, 3 the door hinged at its lower edge to the bar 5 mounted in the extending portions 6 of the end frames and extending from one to the other. The door has a portion 4 at each end of its lower edge curled over to form a short tube through which the bar 5 extends, and its lower edge 7 extends beyond and under the bar to form a projecting flange which extends above the level of the door when it is opened.

On this same bar a shelf 8 is pivotally mounted by means of curled over portions 9 at each end adjacent to the parts 4 and inside them, and between its ends the shelf has its lower edge curled so as to extend around a part of the bar inside the extending lower edge 7 of the door. The shelf also has curved lugs 10 which come in contact with the hinge member 4 when the plate is moved outward to a position approximately at right angles to the door and prevent it from moving farther in that direction. Its movement in the opposite direction is checked by the inner edge of the flange 7, but when the door is closed its outer edge rests upon the bottom tray 11 of the frame. The toast is protected from the heating unit in the middle of the toaster and vertically arranged therein by a fixed grate 12, and during the cooking or toasting operation it is supported by having its lower edge on the plate 8 and its upper edge resting against these bars.

In operation the article to be toasted is laid on the door 3 while the door is open, side flanges 13 and an end flange 14 being provided to prevent it from slipping off, and the door then turned up on its hinge and closed. This brings the article—a slice of bread for instance—to the position indicated by dotted lines on the left of Fig. 2. The bread being first caused to slide inwardly until its inner lower edge is on the plate 8, and then to assume an upright position approximately parallel with the grid 12, the lower end sliding inwardly down the said plate, which, when the door is closed, is inwardly and downwardly inclined. When the door is opened this plate swings upwardly under the influence of the flange 7, which, being on the inner side of the door hinge, swings up as the door swings out and down, and assumes an outwardly and downwardly inclined position (see Figs. 4 and 5), causing the lower edge of the toast to slide down the same and out on the door, with the side which was next to the grid down. When the door is again raised the opposite side of the toast is presented to the grid, and in this manner the toast is reversed.

It will be seen that particles falling from the toast during the toasting operation will fall on the shelf 8, and will have a tendency to slide inwardly thereon to the bottom plate or tray 11. Such particles as remain on the shelf will slide therefrom to the door when the door is opened. In this manner the toaster is kept clean, and is made useful for a greater variety of articles. The imperforate shelf, the curved extension of the door which operates the shelf, and the hinged connections of the door and the shelf are important details of construction, but it will be understood that the details of construction may be varied within certain limits without departing from the scope of the invention.

The heating element 12 consists of suitable resistance wires mounted centrally in the frame, as indicated, but the details of construction of this element are not a part of the present improvements, which are designed to be used in connection with elements of various kinds.

What I claim is:

1. In a device of the character described, the combination with an upright heating device and a frame supporting the same and extending laterally beyond it, of a door hingedly connected to said frame to swing toward and from the said heating device and to upright and horizontal positions, a plate pivotally mounted adjacent to the door hinge and a member extending from said door near its hinge and arranged to engage said plate when the door is moved away from the heating device, and to move the said plate outwardly.

2. In a device of the character described, the combination with an upright heating device and a frame supporting the same and extending laterally beyond it, of a door hingedly connected to said frame to swing toward and from the said heating device and to upright and horizontal positions, a plate pivotally mounted adjacent to the door hinge and a member extending from said door near its hinge and arranged to engage said plate when the door is moved away from the heating device, and to move the said plate outwardly, said door and plate mounted to have independent movement.

3. In a device of the character described, the combination with an upright heating device and a frame supporting the same and extending laterally beyond it, of a door hingedly connected to said frame to swing toward and from the said heating device and to upright and horizontal positions, a plate pivotally mounted adjacent to the door hinge and a member extending from said door near its hinge and arranged to engage said plate when the door is moved away from the heating device, and to move the said device outwardly, said plate mounted to support toast or the like when the door is in upright position.

4. In a device of the character described, the combination with an upright heating device and a frame supporting the same and extending laterally beyond it, of a door hingedly connected to said frame to swing toward and from the said heating device and to upright and horizontal positions, a plate pivotally mounted adjacent to the door hinge and a member extending from said door near its hinge and arranged to engage said plate when the door is moved away from the heating device, and to move the said plate outwardly, said plate being disposed in approximately horizontal position when the door is in upright position and being in oblique position when the door is in horizontal position.

5. In a device of the character described, the combination with an upright heating device and a frame supporting the same and extending laterally beyond it, of a door hingedly connected to said frame to swing toward and from the said heating device and to upright and horizontal position, a plate pivotally mounted on the door hinge, and having independent movement thereon, and a member movable with the door for moving the plate when the door is opened.

6. In a device of the character described, the combination with an upright heating device and a frame supporting the same and extending laterally beyond it, of a door hingedly connected to said frame to swing toward and from the said heating device and to upright and horizontal position, a plate pivotally mounted on the door hinge, and having independent movement thereon, and a member movable with the door for moving the toast supporting device when the door is opened.

7. In a device of the character described, the combination with an upright heating device and a frame supporting the same and extending laterally beyond it, of a door hingedly connected to said frame to swing toward and from the said heating device and to upright and horizontal positions, a toast supporting device pivotally mounted adjacent to the door hinge and a member extending from said door near its hinge and arranged to engage said device when the door is moved away from the heating device, and to move the said device outwardly.

8. The combination of an upright heating member, a frame in which it is mounted, a door hinged to said frame, a device for supporting the toast in upright position also hinged to said frame, and a member movable into engagement with said device when the door is opened carried by said door, said door and device mounted to have independent movement and said device having upward and outward movement under the influence of said moving member.

9. The combination of an upright heating member, a frame in which it is mounted, a door hinged to said frame, a device for supporting the toast in upright position also hinged to said frame, and a member movable into engagement with said device when the door is opened carried by said door, said door and device mounted to have independent movement and said device having upward and outward movement under the influence of said moving member, and said device having a member in contact with the plate when the said device is in upright position.

10. The combination of an upright heating member, a frame in which it is mounted, a door hinged to said frame, a device for supporting the toast in upright position also hinged to said frame, and a member movable into engagement with said device when the door is opened carried by said door, said door and device mounted to have indepenent movement and said device having upward and outward movement under the influence of said moving member, and means for checking and supporting the said device in upright and in approximately horizontal positions.

11. The combination of an upright heating member, a frame in which it is mounted, a door hinged to said frame, a device for supporting the toast in upright position also hinged to said frame, and a member movable into engagement with said device when the door is opened carried by said door, said door and device mounted to have independent movement and said device having upward and outward movement under the influence of said moving member, and fixed bars for supporting the toast laterally positioned between the heating device and the door when in its closed position.

Witness my hand this 22nd day of March, 1922, at the city of Milwaukee, county of Milwaukee, State of Wisconsin.

EDWIN A. RUTENBER.